July 16, 1968     M. R. PIKE ET AL     3,392,529
AIRCRAFT PROVIDED WITH A GAS TURBINE VERTICAL LIFT ENGINE
Filed July 8, 1966     4 Sheets-Sheet 1
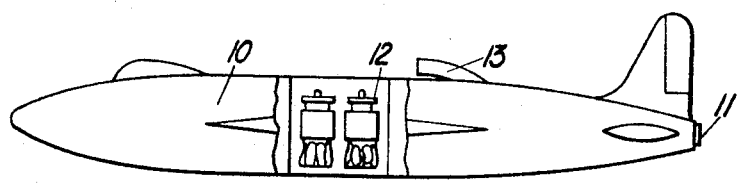
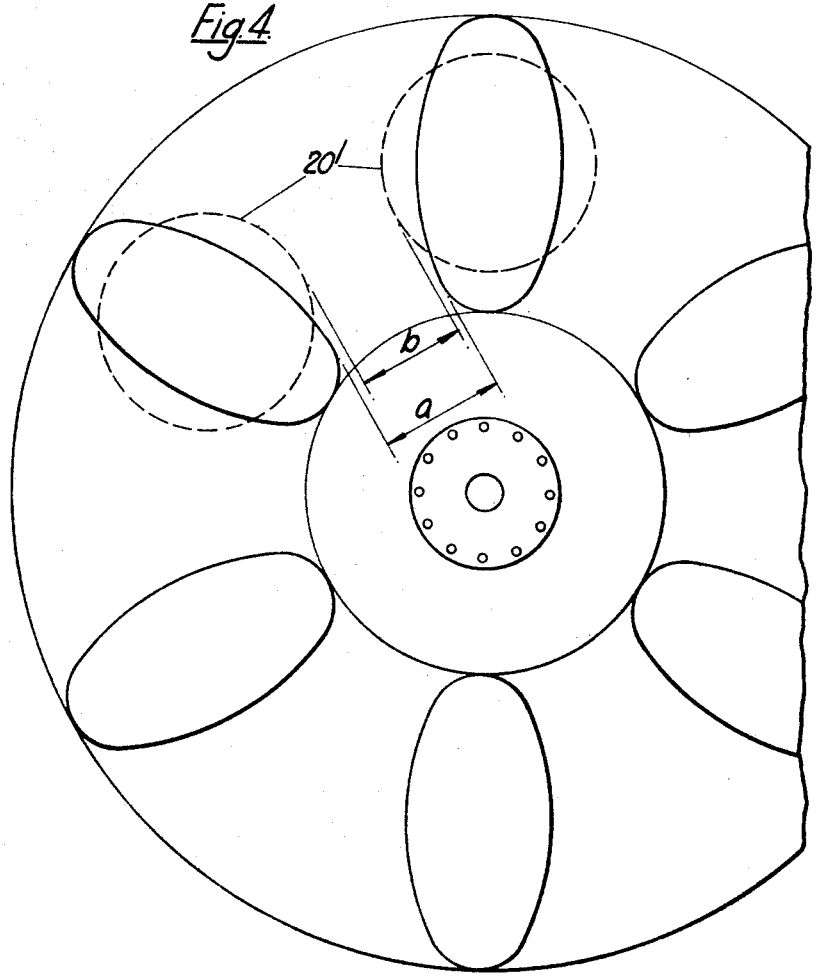
Inventors
MALCOLM ROY PIKE
LINDSAY GRAHAME DAWSON
FRANCIS JEFFREY COLVILLE
DAVID MORRIS BROWN
BY Cushman, Darby & Cushman
Attorneys

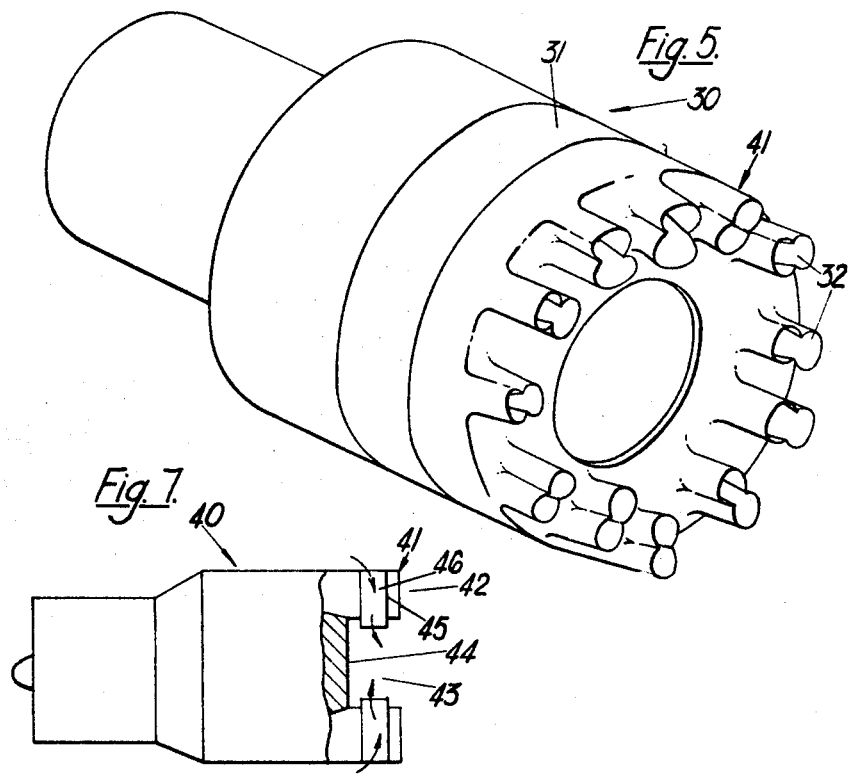
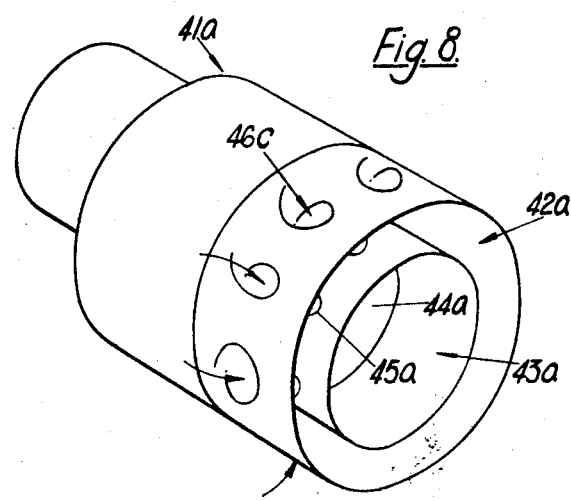

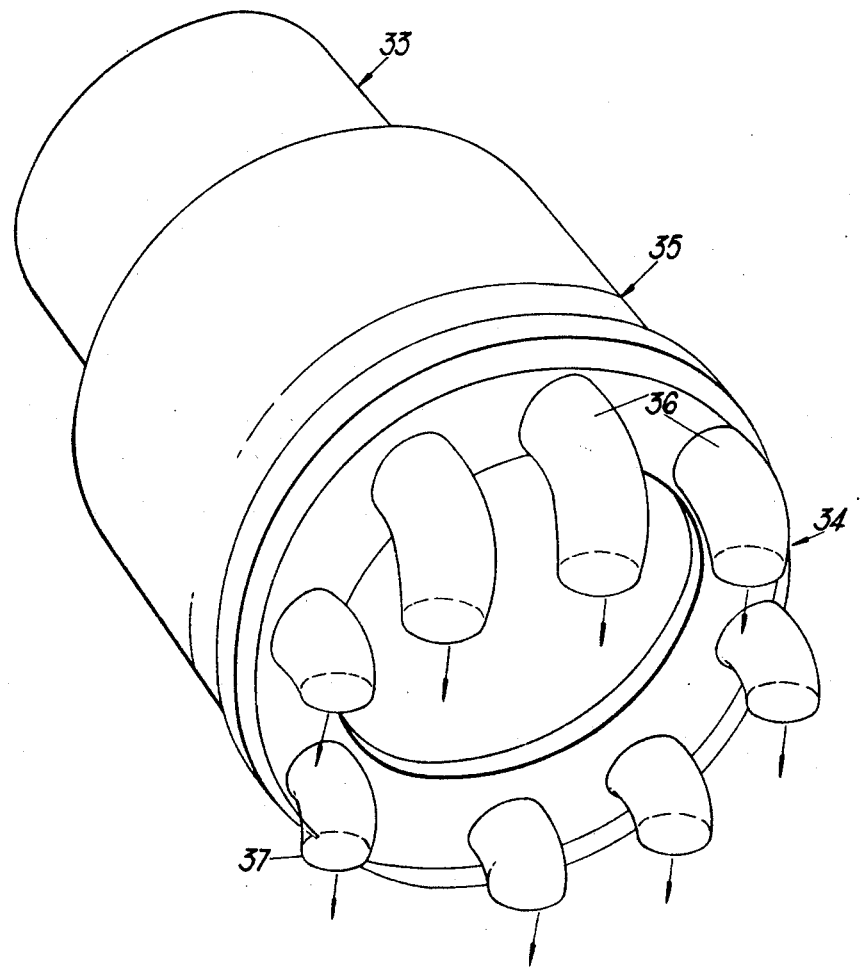

United States Patent Office 3,392,529
Patented July 16, 1968

3,392,529
AIRCRAFT PROVIDED WITH A GAS TURBINE VERTICAL LIFT ENGINE
Malcolm Roy Pike, Woodthorpe, Lindsay Grahame Dawson, Castle Donnington, Francis Jeffrey Colville, Sutton-in-Ashfield, and David Morris Brown, Allestree, Derby, England, assignors to Rolls-Royce Limited, Derby, England, a British company
Filed July 8, 1966, Ser. No. 563,850
Claims priority, application Great Britain, July 23, 1965, 31,602/65
16 Claims. (Cl. 60—232)

ABSTRACT OF THE DISCLOSURE

An aircraft has a gas turbine vertical lift engine having an exhaust nozzle assembly comprising an annular portion received in turbine exhaust gases and several separate nozzles which communicate with the annular portion and through which said exhaust gases are discharged to the atmosphere at an angle to the longitudinal axis of the engine. The exhaust nozzle assembly is rotatable on a common axis with the engine to vary the direction in which the exhaust gases are discharged and jet gases or air are supplied to a space which is positioned radially inwardly of the above-mentioned annular portion to reduce base drag.

---

Figure 2:
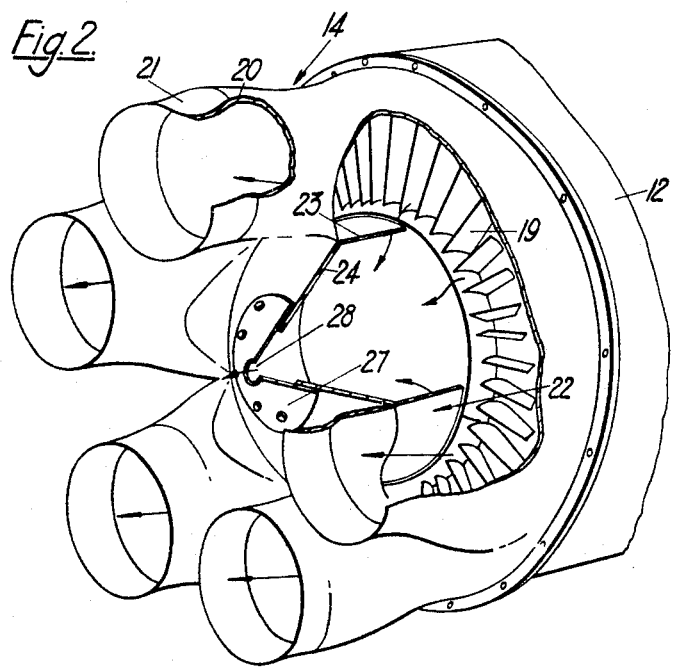

This invention, which is an improvement in or modification of the invention described and claimed in our British Patent No. 890,755 concerns an aircraft provided with a gas turbine vertical lift engine or engines.

The term "vertical lift engine" as used in this specification is to be understood to mean an engine adapted to produce lift forces on the aircraft independently of the lift forces produced aerodynamically by forward flight of the aircraft. For this purpose, the vertical lift engine may have a thrust to weight ratio of at least 8:1 and preferably of at least 16:1.

According to one aspect of the present invention there is provided in an aircraft a gas turbine vertical lift engine having an exhaust nozzle assembly comprising an annular portion receiving the turbine exhaust gases and a plurality of separate nozzles which communicate with said annular portion and through which the exhaust gases are discharged to atmosphere at an angle to the longitudinal axis of the engine, the said exhaust nozzle assembly being rotatable relative to and on a common axis with the engine to vary the direction in which the exhaust gases are discharged to atmosphere, and means being provided for supplying jet gases or air to a space disposed radially inwardly of said annular portion.

The outlet end of each of the nozzles may have its axis at an angle to the axis of the exhaust nozzle assembly.

Each of the nozzles may have a non-circular section and may be spaced from the adjacent nozzles by distances whose minimum values exceed those by which equivalent nozzles of circular section would be spaced.

The nozzles are preferably elliptical in cross section and are arranged with their major axes disposed radially of the said annular portion.

The nozzles may, if desired, have a "multi-bubble" cross sectional shape.

There may be a space disposed radially inwardly of but out of communication with the said annular portion, means being provided for supplying said space with ambient air.

Preferably, the means for supplying the space with ambient air comprise a plurality of angularly spaced apart passages which extend radially through, but which do not communicate with, the said annular portion.

Each said passage may be formed by the interior of a hollow aerofoil-shaped strut which extends radially across the annular portion.

Each said strut may be outwardly flared at its radially outer end.

According to yet another aspect of the present invention, there is provided a gas turbine engine exhaust nozzle assembly comprising an annular portion receiving the turbine exhaust gases, a plurality of separate nozzles which communicate with said annular portion and through which the exhaust gases are discharged, the said exhaust nozzle assembly being rotatable to vary the direction in which the exhaust gases are discharged to the atmosphere, and a casing member being arranged at the center of the exhaust nozzle assembly said casing having an open downstream end and being provided with a removable plate which covers said open downstream end and a central aperture of a predetermined size.

Figure 3:
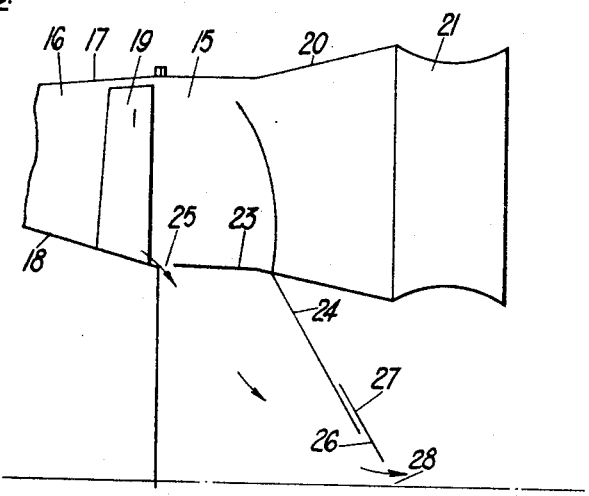

The invention is illustrated, merely by way of example, in the accompanying drawings, in which:

FIGURE 1 is a side elevation of an aircraft according to the present invention, provided with gas turbine vertical lift engines, FIGURE 2 is a perspective view of the exhaust nozzle assembly of one of the said vertical lift engines, FIGURE 3 is a diagrammatic section of a part of the exhaust nozzle assembly shown in FIGURE 2, FIGURE 4 is a diagrammatic elevation of the said exhaust nozzle assembly, FIGURES 5 and 6 are diagrammatic perspective views of two different modified exhaust nozzle assemblies each of which may be used on one of the said vertical lift engines, FIGURE 7 is a diagrammatic side elevation of a gas turbine engine provided with an exhaust nozzle assembly in accordance with the present invention, and FIGURE 8 is a diagrammatic perspective view of a modified exhaust nozzle assembly.

In FIGURE 1 is shown an aircraft 10 having a single, gas turbine, forward propulsion engine 11 and a plurality (e.g. four) of gas turbine vertical lift engines 12. The engines 12 may be permanently maintained in the vertical position shown or they may be movable into this position when so required. An air intake duct 13 is provided for the forward propulsion engine 11.

Each engine 12 has an exhaust nozzle assembly 14 which has an annular portion 15 (FIGURE 3), the portion 15 being aligned with the main annular fluid duct 16 of the engine which is defined between the engine casing 17 and an inner wall 18. The annular portion 15 is arranged immediately downstream of second stage turbine blades 19 of the engine so as to receive the turbine exhaust gases.

The exhaust nozzle assembly 14 comprises six nozzles 20 which communicate with the annular portion 15, the nozzles 20 being spaced from each other by equal angular intervals and being arranged around a common circle whose centre lies on the longitudinal axis of the engine. As clearly shown in FIGURE 3, each of the nozzles 20 is so arranged in relation to the annular portion 15 and fluid duct 16 that the exhaust gases flowing therethrough follow a straight path which is parallel to the longitudinal axis of the engine. Thus the nozzles 20 help to straighten the flow of swirling turbine exhaust gases.

Each of the nozzles 20 has a non-circular section and is spaced from the adjacent nozzles 20 by distances whose minimum values are indicated at $a$ in FIGURE 4. As will be seen, these distances $a$ are greater than the minimum distances $b$ by which equivalent nozzles 20' of circular section would be spaced. By "equivalent nozzles" is meant nozzles having the same axes as the nozzles 20 and having the same cross-sectional area at their downstream end.

By reason of the non-circular section of the nozzles 20 more ambient air will be able to enter between the nozzles 20 than would otherwise be the case. This assists in the avoidance of a suction zone between the nozzles 20 which would cause base drag. Moreover, this arrangement of non-circular nozzles 20, by increasing the flow therebetween of ambient air, reduces the temperature of the mixture of ambient air and exhaust gases.

At its downstream end, each of the nozzles 20 has a convergent-divergent portion 21. This produces an effectively large area nozzle outlet which is useful for low speed running of the engine since it lightens the work of the compressor of the engine.

Arranged at the centre of the exhaust nozzle assembly 14 is a hollow casing member 22 having a substantially cylindrical upstream portion 23 and a frusto-conical downstream portion 24. The portion 23 is spaced by a gap 25 from the inner wall 18 so as to permit some of the turbine exhaust gases to flow through this gap and into the hollow interior of the casing member 22.

The casing member 22 has an open downstream end 26 whose cross sectional area is substantially less than that of the upstream end of the casing member. Bolted to the casing member adjacent its downstream end is a substantially conical trimmer plate 27 having a central aperture 28. Thus the aperture 28, which is disposed on the longitudinal axis of the engine, acts as an additional nozzle member. Accordingly the total nozzle area can be adjusted by replacing a trimmer plate 27 by another trimmer plate having a different sized aperture 28.

If desired, each of the nozzles 20 may have a cascade of vanes (not shown) mounted therein, and the annular portion 15 may be rotatable (by means not shown) with respect to the main annular fluid duct 16, so as to permit the direction in which the exhaust gases are discharged to atmosphere to be altered, e.g. so that they may be downwardly deflected by rotating the annular portion 15.

In FIGURE 5 there is shown an exhaust nozzle assembly 30 having an annular portion 31, which is arranged to receive the turbine exhaust gases, and a plurality of separate nozzles 32 each of which communicates with the annular portion 31 and through which the exhaust gases are discharged. Each of the nozzles 32 has a "multi-bubble" cross sectional shape to assist in effecting silencing.

In FIGURE 6 there is shown an exhaust nozzle assembly 33 having an annular portion 34 which is arranged to receive the turbine exhaust gases and which is rotatably mounted by means of a ball or roller bearing assembly (not shown) with respect to the upstream portion 35 of the exhaust nozzle assembly.

The exhaust nozzle assembly 33 has a plurality of separate, tubular, nozzle members 36 each of which communicates with the annular portion 34. The tubular nozzles 36 are bent so that their outlet ends 37 have their axes at an angle (e.g. at right angles) to the longitudinal axis of the exhaust nozzle assembly 33.

It will be appreciated that an exhaust nozzle assembly such as that illustrated in FIGURE 6, can be easily adapted for use with gas turbine engines the exhaust gases from which are required to be exhausted, via trunking, through the side of the fuselage or of a power plant of the aircraft. Thus the annular portion 34 can be arranged to protrude through the said side of the fuselage or power plant and may be rotated relative to upstream portion 35 so as to exhaust the gases in the desired direction.

In FIGURE 7 there is shown a gas turbine engine 40 provided with an exhaust nozzle assembly 41 having an annular portion 42 which is arranged to receive the turbine exhaust gases. The downstream end of the annular portion 42 may, as shown, communicate directly with atmosphere or may communicate with a plurality of separate nozzle members (not shown) through which the exhaust gases may be discharged.

A space 43, whose upstream end is closed off by a trimmer plate 44 and whose downstream end is open to atmosphere, is disposed radially inwardly of, but out of communication with, the annular portion 42.

A plurality of angularly spaced apart hollow, aerofoil-shaped struts 45 extend radially across the annular portion 42. A passage 46 is thus provided within each strut 45 which does not communicate with the annual portion 42, the radially outer and inner ends of each passage 46 communicating respectively with the ambient air and with the space 43.

The supply of ambient air to the space 43 helps to prevent the base drag to which the exhaust nozzle assembly 41 might otherwise be subject.

In FIGURE 8 there is shown an exhaust nozzle assembly 41a which is generally similar to the exhaust nozzle assembly 41 of FIGURE 7 and which for this reason will not be described in detail, similar parts being indicated by the same reference numerals with the suffix a.

In the FIGURE 8 construction, however, the struts 45a are outwardly flared at their radially outer ends.

We claim:

1. In an aircraft, a gas turbine vertical lift engine having an exhaust nozzle assembly comprising an annular portion receiving turbine exhaust gases, a plurality of separate nozzles each communicating with said annular portion and through which exhaust gases are discharged to atmosphere at an angle to the longitudinal axis of said engine, and a space disposed at least radially inwardly of said annular portion, said exhaust nozzle assembly being rotatable relative to and on an axis common with the longitudinal axis of said engine to vary the direction in which exhaust gases are discharged to atmosphere, and means for supplying a fluid to the space disposed radially inwardly of said annular portion.

2. An aircraft as claimed in claim 1 in which the outlet end of each of the nozzles has its axis at an angle to the axis of the exhaust nozzle.

3. An aircraft as claimed in claim 1 in which each of the nozzles has a non-circular section and is spaced from the adjacent nozzles by distances whose minimum values exceed those by which equivalent nozzles of circular section would be spaced.

4. An aircraft as claimed in claim 1 in which the nozzles are elliptical in cross section and are arranged with their major axes disposed radially of the said annular portion.

5. An aircraft as claimed in claim 1 in which the nozzles have convergent-divergent portions at their downstream ends.

6. An aircraft as claimed in claim 1 in which the nozzles have a "multi-bubble" cross sectional shape.

7. An aircraft as claimed in claim 1 in which the said annular portion is arranged immediately downstream of the turbine means of the gas turbine engine.

8. An aircraft as claimed in claim 1 in which the nozzles are arranged around a common circle and are spaced from each other by equal angular intervals, the centre of the common circle lying on the longitudinal axis of the engine.

9. An aircraft as claimed in claim 1 in which there is an additional nozzle disposed on the longitudinal axis of the engine.

10. In an aircraft, a gas turbine vertical lift engine having an exhaust nozzle assembly comprising an annular portion receiving turbine exhaust gases, a plurality of separate nozzles each communicating with said annular portion and through which exhaust gases are discharged to atmosphere at an angle to the longitudinal axis of the engine, said exhaust nozzle assembly being rotatable to vary the direction in which exhaust gases are discharged to atmosphere, and a casing member being arranged at the center of said exhaust nozzle assembly, said casing member having an open downstream end and being provided with a removable plate which covers said open downstream end, said removable plate having a central aperture of a predetermined size.

11. An aircraft as claimed in claim 10 having a plurality of engines which are vertically arranged.

12. An aircraft as claimed in claim 1 in which said space disposed radially inwardly of said annular portion is out of communication with the said annular portion and in which said means supplies said space with ambient air.

13. An aircraft as claimed in claim 12 in which the means for supplying the space with ambient air comprise a plurality of angularly spaced apart passages which extend radially through, but which are out of communication with, the said annular portion.

14. An exhaust nozzle assembly as claimed in claim 13 in which each said passage is formed by the interior of a hollow aerofoil-shaped strut which extends radially across the annular portion.

15. An exhaust nozzle assembly as claimed in claim 14 in which each said strut is outwardly flared at its radially outer end.

16. An aircraft as claimed in claim 10 in which said casing member communicates with said annular portion and in which said casing member has a cross-section diminishing in a downstream direction.

References Cited

UNITED STATES PATENTS

| | | | |
|---|---|---|---|
| 2,879,014 | 3/1959 | Smith | 60—232 |
| 2,986,877 | 6/1961 | Emmons | 60—232 |
| 2,999,656 | 9/1961 | Ward | 60—232 |
| 3,025,667 | 3/1962 | Moorehead | 239—265.35 |
| 3,050,937 | 8/1962 | James | 60—263 |
| 3,143,184 | 8/1964 | Denning | 60—264 |
| 3,333,772 | 8/1967 | Bruner | 60—263 |

FOREIGN PATENTS

| | | |
|---|---|---|
| 836,175 | 6/1960 | Great Britain. |
| 862,560 | 3/1961 | Great Britain. |
| 894,299 | 4/1962 | Great Britain. |

CARLTON R. CROYLE, *Primary Examiner.*

DOUGLAS HART, *Examiner.*